No. 801,334. PATENTED OCT. 10, 1905.
P. PAŘIK.
WHEEL.
APPLICATION FILED DEC. 20, 1904.

Witnesses
H. M. Kuehne
John A. Percival

Inventor
Petr Pařik
By Richardson
Attorneys

No. 801,334. PATENTED OCT. 10, 1905.
P. PAŘIK.
WHEEL.
APPLICATION FILED DEC. 20, 1904.
2 SHEETS—SHEET 2.
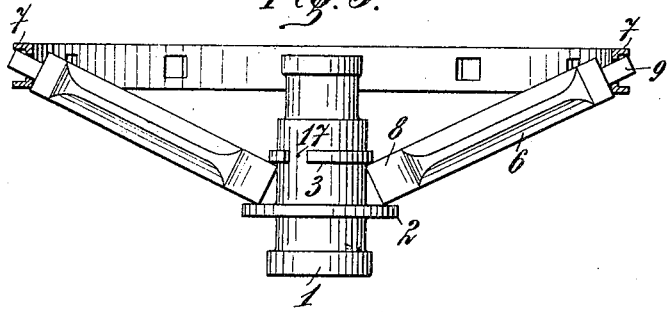
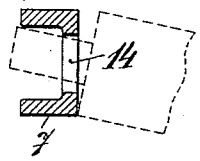 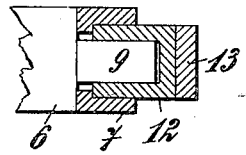
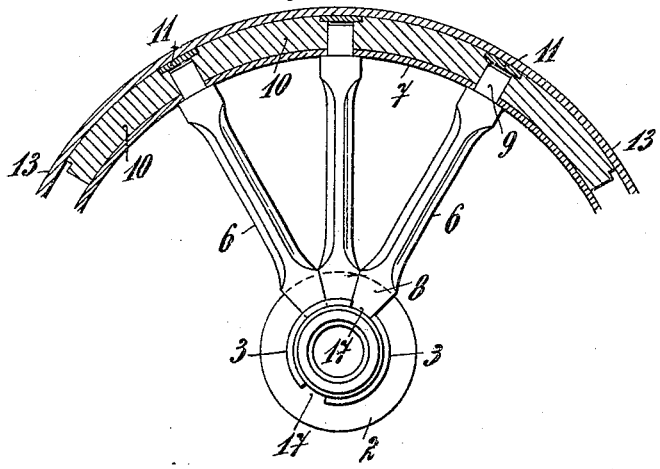
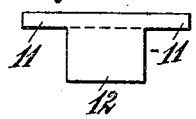 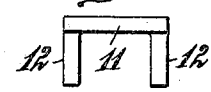
Witnesses
Inventor
Petr Pařik

UNITED STATES PATENT OFFICE.

PETR PAŘIK, OF MÍSTEK, AUSTRIA-HUNGARY, ASSIGNOR OF TWO-THIRDS TO ANTONIN PAŘÍK AND JAN GEISLER, OF MORAVSKA, OSTRAVA, AUSTRIA-HUNGARY.

WHEEL.

No. 801,334.      Specification of Letters Patent.      Patented Oct. 10, 1905.

Application filed December 20, 1904. Serial No. 237,699.

*To all whom it may concern:*

Be it known that I, PETR PAŘIK, a subject of the Emperor of Austria-Hungary, residing at Místek, in Moraviam, Empire of Austria-Hungary, have invented a new and useful Wheel, (for which I shall obtain a patent in Austria, filed partly March 8, 1903,) of which the following is a specification.

My invention relates to wheels which are composed of spokes and tires; and the object of it is an improvement of such wheels, the spokes and fellies of which are sprung into position between the tire and the nave without the least risk or shake and with the possibility of mounting or dismounting each spoke independently from the others, so as to join the facility of construction with the highest strength and solidity, though the manufacture is greatly facilitated and does not require large machinery nor power. In reducing the price of manufacture and maintaining I try to enlarge the durability through this my improved construction and invention. I attain these objects by the mechanism illustrated in the accompanying drawings, in which—

Figure 1:
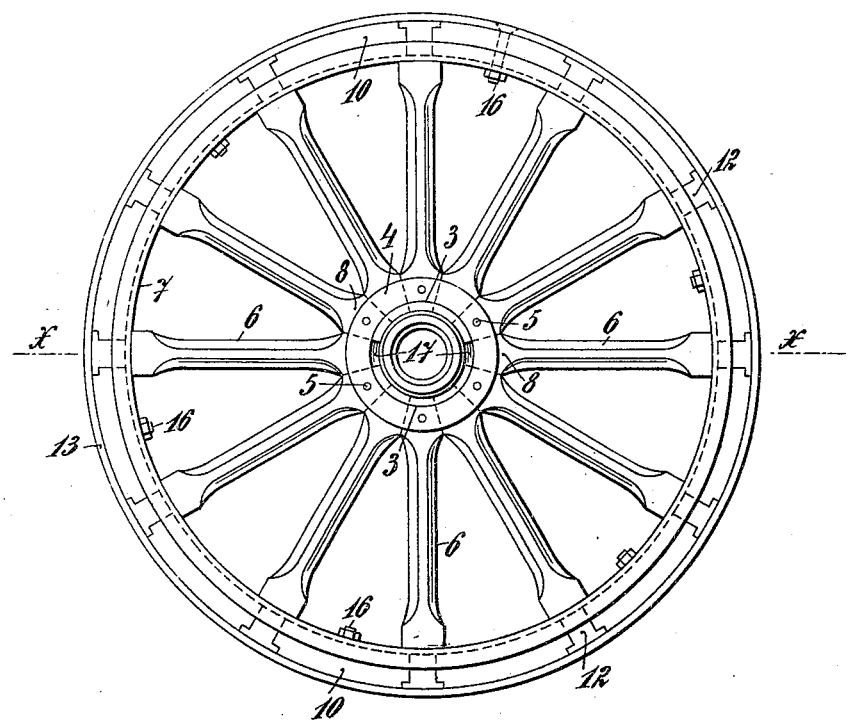
Figure 2:
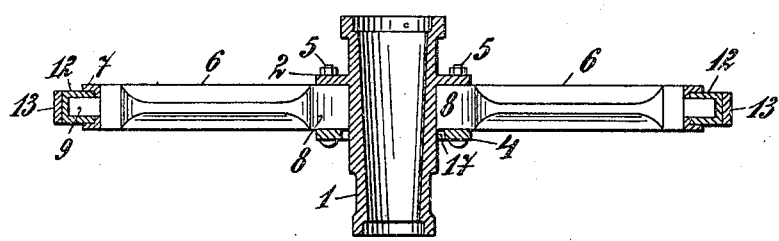

Figure 1 is a front view of the mounted wheel. Fig. 2 is a cross-section on the line *x x*, Fig. 1. Fig. 3 shows the mounting or dismounting of the wheel if all the spokes have to be introduced or taken out at once after having taken out the screw-bolts near the nave. Fig. 4 is a cross-section of the wheel-ring perpendicularly to the axis. Figs. 5 and 6 are details illustrating the connection of the tenons of the spokes with the U-formed ring and the fastening of the fellies by the caps of the tenons. Figs. 7 and 8 show the cap in two views.

Similar numerals refer to similar parts throughout the several views.

The wheel is composed of a central nave 1, which is provided with two flanges 2 and 3, the latter being considerably smaller in diameter than the former one. Said nave 1 is united with the wheel-ring 7 10 13 by spokes 6.

The middle part of the spokes may be of any suitable shape; but their inner ends 8 are formed so that they fit closely against each other and between said two flanges 2 and 3. It will be remarked that the smaller flange 3 is cut out in one or in several places, so as to allow the wedge-shaped inner ends 8 of the spokes to slip through said opening or openings 17. A ring or collar 4, whose inner diameter is equal to the outward diameter of the small flange 3, is put over the ends 8 of the spokes when mounted, said ring forming a continuation of the flange 3 and being held in place by screw-bolts 5, which pass through the inner ends 8 of the spokes and through the flange 2.

In mounting or taking to pieces my new wheel the spokes may be introduced or taken out either all at once or one by one, as the case may require. In the first case the tenons 9 of the spokes 6 are introduced into their openings 14 of the wheel-ring 7 and their inner ends 8 between the flanges 2 and 3, reposing upon the larger flange 2 in a strongly-inclined position, as shown in Fig. 3. A small pressure upon the nave exerted in the direction of the axis suffices to put the spokes and the nave 1 into their final position. The ends 9 of the spokes are covered with special caps 11 12 after having put in the filling-pieces 10 between the tenons 9, so as to fasten the filling-pieces by said caps. Finally, the tire 13 is mounted on the outer surfaces of the caps and filling-pieces. It will be remarked that the openings 14 must be larger in diameter than the diameter of the tenons 9, so as to allow the tenons to pass through them in their inclined position, as shown in Figs. 3 and 5. If the wheel is to be dismounted at once, the proceeding is the same, only in reverse order; but the spokes can be put in or taken out also one by one independently of the other spokes as well as of the other parts of the wheel if only the bolts 5 are loosened and taken out and the ring 4 removed. It will be evident that then the flange 3 will not hinder the spokes from being taken out or put in, it only being necessary to turn the wheel until one of the openings 17 comes opposite the end of the spoke to be removed.

It will be understood that openings like 17 can be provided for one spoke only as well as for two or even more of the spokes at once, if desirable.

The invention is applicable to wheels of all kinds.

Having now particularly described and ascertained the nature of my said invention and in what manner the same is to be performed, I declare that what I claim is—

1. In a spoke-wheel the combination of spokes having wedge-shaped inner ends and tenons formed on their outer ends, of a center nave having two flanges thereon between which the inner ends of the spokes fit, a wheel-ring having outwardly-extending flanges, said ring having openings therein adapted to receive the tenons on the outer ends of the spokes, filling-pieces fitting between the flanges of the wheel-ring and between the said tenons, caps covering the tenons and holding the filling-pieces in position and a tire fitting over the caps and filling-pieces, substantially as described.

2. The combination in a spoke-wheel, of spokes having wedge-shaped inner ends, a nave having flanges thereon, one of said flanges being short and having openings through which the ends of the spokes are adapted to pass, a ring forming an outward continuation of the small flange, and means for detachably securing said ring in position so as to hold the spokes between the flanges, substantially as described.

In testimony whereof I affix my signature in presence of two witnesses.

PETR PAŘIK.

Witnesses:
ANTONIN PAŘIK,
JAN GEISLER.